(12) United States Patent
Burris et al.

(10) Patent No.: US 8,670,708 B2
(45) Date of Patent: Mar. 11, 2014

(54) PORTABLE WIRELESS THROUGH-THE-EARTH COMMUNICATION SYSTEM

(75) Inventors: Daniel P. Burris, San Antonio, TX (US); Thomas D. Hosbach, San Antonio, TX (US); Mark O. Oerkfitz, San Antonio, TX (US); Christopher R. Tripp, San Antonio, TX (US); John P. Weiblen, San Antonio, TX (US)

(73) Assignee: E-Spectrum Technologies, Incorporated, San Antonio, TX (US)

( * ) Notice: Subject to any disclaimer, the term of this patent is extended or adjusted under 35 U.S.C. 154(b) by 118 days.

(21) Appl. No.: 13/193,043

(22) Filed: Jul. 28, 2011

(65) Prior Publication Data

US 2012/0076178 A1    Mar. 29, 2012

Related U.S. Application Data

(60) Provisional application No. 61/387,875, filed on Sep. 29, 2010.

(51) Int. Cl.
*H04B 13/02* (2006.01)

(52) U.S. Cl.
USPC .............................. 455/40; 455/41.2; 455/41.3

(58) Field of Classification Search
USPC .......................... 455/40, 41.1–41.3, 73, 151.2
See application file for complete search history.

(56) References Cited

U.S. PATENT DOCUMENTS

| | | | |
|---|---|---|---|
| 4,652,857 A | 3/1987 | Meiksin | |
| 5,432,838 A | 7/1995 | Purchase | |
| 5,809,429 A | 9/1998 | Knop | |
| 7,043,195 B2 * | 5/2006 | Bunton et al. | 455/11.1 |
| 7,050,831 B2 * | 5/2006 | Meiksin et al. | 455/560 |

* cited by examiner

*Primary Examiner* — Tuan H Nguyen
(74) *Attorney, Agent, or Firm* — Robert L. McRae; Gunn, Lee & Cave, P.C.

(57) ABSTRACT

A portable wireless through-the-earth bi-directional communication system for sending and receiving text data using ultra-low-frequency electric current and the earth as the conductive media. A surface controller which executes application software which controls the communication functions of the system. A surface receiver and surface transmitter are connected to sets of electrodes which provide the electric current, and are in communication with the surface controller. Text data are encoded into data packets, modulated onto ultra-low-frequency electric carrier waves, and transmitted through the earth by the surface electrodes to a subsurface transceiver. The subsurface transceiver demodulates, converts and displays incoming signals into text messages. The subsurface transceiver has a user interface to allow subsurface users to submit text data to the surface receiver. The transceiver converts the text data into analog data packets, modulates the packets onto ultra-low-frequency carrier waves, and transmits the signal to the surface receiver.

20 Claims, 8 Drawing Sheets

PORTABLE WIRELESS THROUGH-THE-EARTH COMMUNICATION SYSTEM

This is an original utility patent application claiming priority to U.S. Provisional Patent Application No. 61/387,875, filed Sep. 29, 2010.

BACKGROUND OF THE INVENTION

1. Field of the Invention

The present invention relates generally to ultra-low-frequency communication systems. More particularly, the present invention relates to a portable wireless through-the-earth bi-directional communication system for providing wireless communication between people physically separated by the earth or other material that prevents the ability to communicate by traditional open-air communication systems. The present invention eliminates the need for current loop antennae, magnetic flux coupling, or leaky feeder cabling to communicate through the earth. The present system employs ultra-low-frequency electric fields to penetrate the earth thereby transmit longer distances, and establishes a wireless bi-directional communication system used for sending and receiving text messages or predefined data encoded beacons.

2. Description of the Related Art

There exists in the prior art through-the-earth communication systems which employ electromagnetic waves and loop antennas for transmitting and receiving audio and digital data between the surface and subsurface components. However, such systems are characterized as having limited through-the-earth range. Moreover, such systems require coupling of the magnetic field between the antennas. Proper alignment of the surface and subsurface loop antennas is required to achieve maximum transmission distance. To increase transmission distance in these systems, larger loop antennas may be employed, such as wrapping a wire around a coal pillar inside a coal mine.

However, these modifications are impractical and perhaps impossible in underground emergencies such as cave-ins or explosions. Increasing the transmission distance by increasing current flow through the loop is usually not available because energy transmission must be limited in most underground environments for safety purposes, as a spark ignition of explosive gases is possible. Thus, these systems result in providing much shorter transmission distances through the earth than is desirable to communicate with trapped personnel to aid in their rescue.

There also exists in the prior art wireless communication systems in mines using "leaky feeders" as radiating transmission lines. However, these systems require radiating transmission lines to be in place within the mines or underground areas, and to survive explosions and/or cave-ins in order to work, which is often not the case in many underground emergency situations. Thus, the leaky feeder systems are not reliable to be operational in underground emergency situations.

BRIEF SUMMARY OF THE INVENTION

The present invention is different than the prior art. The present invention provides a wireless through-the-earth communication system without the need for current loop antennae or leaky feeder cabling to transmit through the earth. The present invention allows for bi-directional communication between individuals on the earth's surface and individuals underground, even where all electrical infrastructures are obliterated or non-functional, and limited space is available underground.

The communication system of the present invention uses ultra-low electric frequencies to communicate through the earth. The present invention comprises a surface controller in wireless or serial communication with a surface receiver and a surface transmitter. The surface controller comprises a typical computer having wireless and serial connectivity capabilities. In one embodiment, the surface controller comprises a notebook or laptop computer with a central processor, wireless and serial connectivity ports, a hard drive, and an appropriate operating system to execute software. The surface controller has loaded thereon and provides the run-time platform for surface controller application software. The surface controller application software provides the user interface for the surface user, and contains a demodulation module which demodulates incoming ultra-low-frequency phase-modulated electric carrier waves that carry the signal data. The surface controller application software also controls and manages all communications of the communication system.

The surface receiver and surface transmitter are connected to a plurality of surface electrodes. The surface electrodes are electrodes that are inserted into the ground to transmit ultra-low-frequency phase-modulated electric carrier waves, once data packets, telemetry data and/or binary data are located thereon. In the preferred embodiment, the surface receiver and the surface transmitter are connected to two sets of surface electrodes. However, more or less than two sets of surface electrodes may be connected to the surface receiver and surface transmitter. The additional surface electrodes may be constructed and configured to additional signal conditioning channels in the surface receiver, which can be monitored or used for noise subtraction, if desired.

The surface transmitter of the present invention is in communication and interfaces with a subsurface transceiver via the surface electrodes, using ultra-low-frequency phase modulated electric carrier waves. In one embodiment, the subsurface transceiver is connected to infrastructure metal within the mine via at least two conductive clamps, which serve as subsurface electrodes. In another embodiment, the subsurface transceiver is attached via conductive connectors to a plurality of steel pipes that are driven into the earth within the mine, which serve as the subsurface electrodes. The subsurface transceiver is in communication and interfaces with the surface receiver via the subsurface electrodes, using ultra low-frequency phase-modulated electric carrier waves.

The surface controller application software controls the communication system of the present invention. The surface controller application software comprises a module containing predefined beacons of data which are contained and organized on a user-interface menu for selection by the user. The predefined beacons are displayed as predetermined text messages on the user interface of the surface controller.

Once selected by the user, the predefined beacon is transformed from digital to analog data and is configured into command data packets by the surface controller application software, and then sent to the surface transmitter. The surface controller application software modulates the current driven through the earth by the surface electrodes. In one embodiment, QPSK modulation is used to modulate the electric current. However, other modulation could be used as well.

The surface transmitter converts the command data packets to phase-modulated electric carrier waves and transmits the carrier waves to the subsurface transceiver through the electric field current created by the surface electrodes. The output driver of the surface transmitter mates with on-board connectors to attach to the surface electrodes. The output driver drives the phase-modulated electric carrier waves to the surface electrodes, which transmit through the earth to the subsurface electrodes.

In one embodiment, the surface electrodes comprise a plurality of steel pipes that are manually embedded into the earth. However, any material suitable for establishing a low impedance ground connection conducive to producing/receiving ultra-low-frequency electric fields there through can be used. At least two sets of surface electrodes are spaced a predefined distance from each other to establish an electrical current, with the earth being the conductive media there between. The surface electrodes provide an ultra-low-frequency electric current through the earth, and are used to transmit the phase-modulated electric carrier waves to the subsurface transceiver, and receive the same therefrom.

In configuring the surface electrodes, the resistivity of the soil is measured using a four-pole method. Four ground stakes are inserted into the earth in a line. A known current is generated through the outer two stakes, and a drop in voltage potential is measured between the two inner ground stakes. The stakes are turned ninety degrees, and this process is repeated, and the resistivity measurements are averaged. Once the resistivity of the soil is known, the required size and orientation of the surface electrodes can be determined from predetermined data sets. The resistance between the surface electrodes should be minimized. In the preferred embodiment, at least two sets of surface electrodes are configured for providing an ultra-low-frequency electric current there between and transmitting and receiving signals on the surface.

The present invention uses differential voltage measuring to detect transmissions through the electric field. The voltage difference between the sets of surface electrodes produces the electric current. The current distribution is set up between the sets of surface electrodes. The surface receiver measures the voltage differential across the electric field. Measuring the voltage differential allows the receiver to detect an incoming signal from the subsurface transceiver.

The subsurface transceiver is preferably a battery-powered unit having a CPU, a controller, data acquisition module, conditioner for signal conditioning, and an output driver. The subsurface transceiver uses the CPU to perform the transmission and reception functions. In one embodiment, the CPU is an ARM 7-core, 32-bit processor with at least 4 MB of in circuit reprogrammable flash memory. However, other CPU's with other specifications could be used. The subsurface transceiver is, in the preferred embodiment, connected to at least two sets of subsurface electrodes. In one embodiment, the subsurface electrodes comprise a plurality of steel pipes embedded into the earth in a configuration similar to the surface electrodes. The subsurface electrodes produce an electric current for the transmission of phase modulated electric carrier waves in the same manner as the surface electrodes. In an alternative embodiment, electrodes may be made by clamping a set of clamps to existing metal infrastructure within the mine. In such an embodiment, the claims have attached thereto a set of modular electrical connections that connect into the subsurface transceiver.

The data acquisition module of the subsurface transceiver detects an incoming message by measuring the voltage differential across the subsurface electrodes. The CPU of the subsurface transceiver demodulates the phase-modulated electric carrier waive, and acquires the data therein through the data acquisition module. The conditioner conditions the analog signal into digital format and displays the digital signal in the form of a text message on the user interface of the transceiver.

The transceiver is equipped with a user interface device such as a controller or keypad that allows the user to select the predefined beacon of data which corresponds to a text message from a predefined beacon menu. Alternatively, text messages can be input by the user using the keypad. Once the user sends the beacon or message, the CPU of the receiver converts the data from digital to analog, modulates the signal in the ultra-low-frequency electric carrier wave, and sends the same to the output driver of the transceiver. The output driver of the transceiver sends the signal through the subsurface electrodes via an electric field to the surface receiver, where the signal is demodulated, converted to digital format, and sent to display on the surface controller as a text message, all of which is performed by the surface controller application software.

DETAILED DESCRIPTION OF THE INVENTION

Figure 1A:
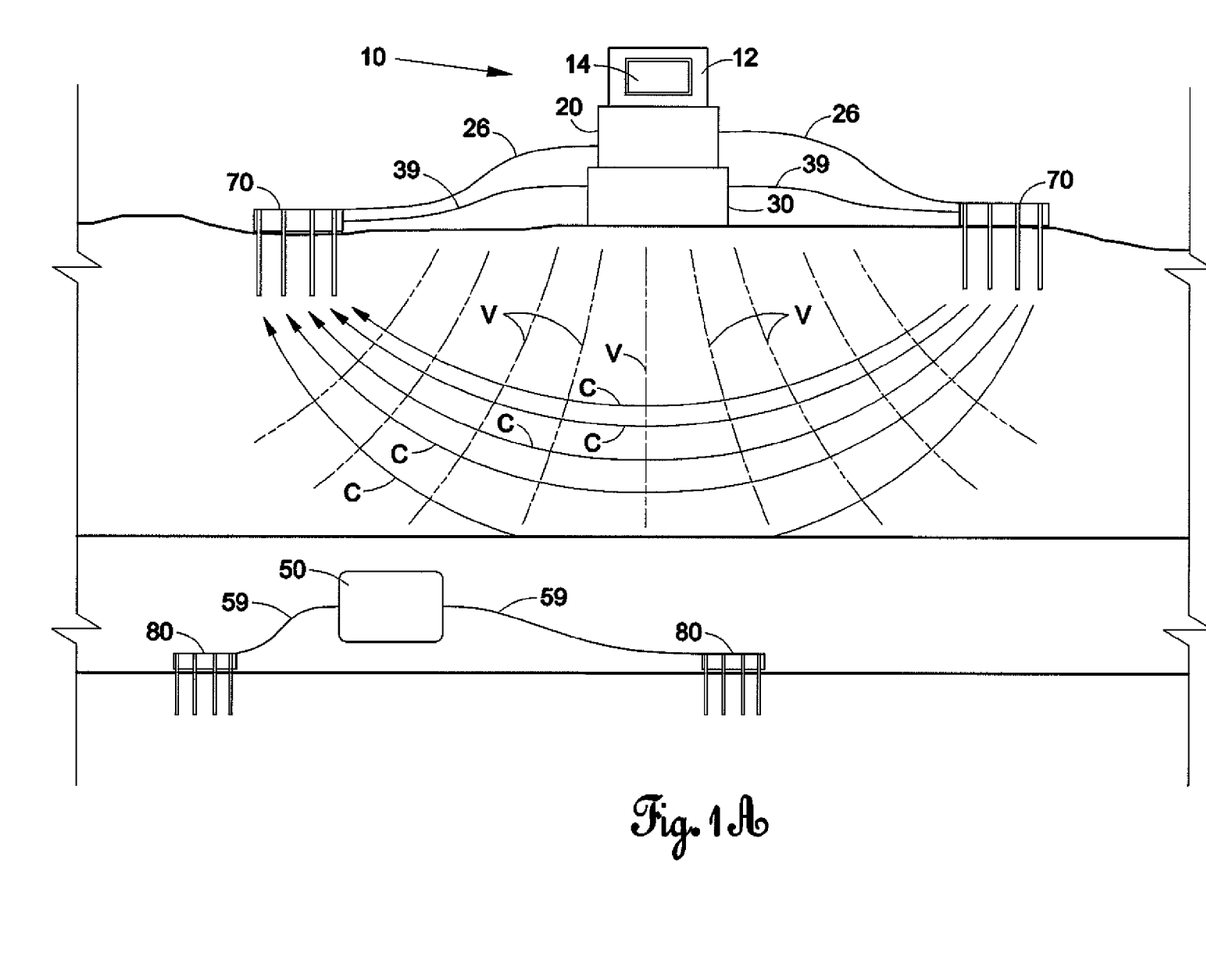
FIG. 1A is a side view showing an installation of the present invention in the preferred embodiment.

Referring to FIG. 1A a typical installation of the communication system 10 of the preferred embodiment is disclosed. The communication system 10 uses ultra-low-frequency electric waves to communicate through the earth with people beneath the earth's surface, such as in mines. The surface components of the communication system 10 of the preferred embodiment comprise a surface controller 12, a surface receiver 20, a surface transmitter 30 and more than one set of surface electrodes 70. As shown and described herein, the surface receiver 20 and surface transmitter 30 are separate units. However, the surface receiver 20 and surface transmitter 30 could be combined within the same housing, forming a single unit which performs the functions of both the surface receiver 20 and surface transmitter 30.

In the preferred embodiment, the surface controller 12 comprises a notebook or laptop computer with a central processor (not shown), wireless and serial connectivity ports (not shown), a hard drive (not shown), and an appropriate operating system (not shown) to execute software (not shown). The surface controller 12 has a keypad (not shown) or keyboard (not shown) and a monitor 14 which provide the surface user interface for the communication system 10. The surface controller 12 has loaded thereon and provides the ran-time platform for surface controller application software (not shown). The surface controller application software provides the central control for the entire communication system 10.

Figure 2:
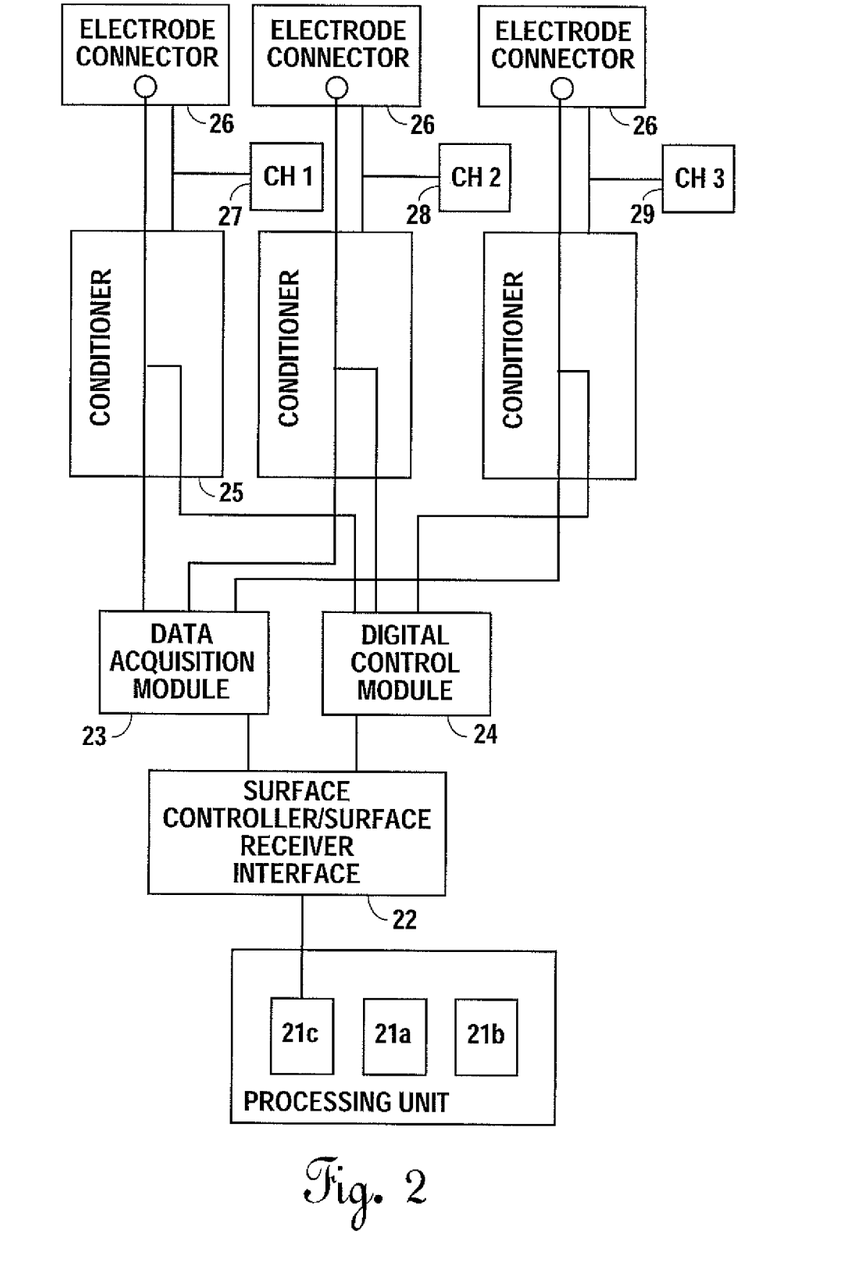
FIG. 2 is a block diagram showing the subcomponents of the surface receiver of the present invention.

The surface controller 12 interfaces with the surface receiver 20 either wirelessly or through a USB port 21c. Referring to FIG. 2, a block diagram of the subcomponents of the surface receiver 20 is disclosed. The surface receiver 20 comprises a processing unit 21, which has receiver module 21a, system control module 21b and a USB port 21c. The USB port 21c provides the interface 22 between the surface receiver 20 and the surface controller 12. The surface controller 12 interfaces with the surface receiver 20 and the surface controller application software is in communication with the digital control module 24 and data acquisition module 23 of the surface receiver 20. As shown in FIG. 2, the surface receiver comprises multiple channels 27, 28 and 29. Three channels 27, 28 and 29 are shown for exemplary purposes only. It should be understood that more or fewer channels may exist on receiver 20 within the scope of the present invention. Moreover, fewer than all of the channels 27, 28 and 29 may be utilized. Each channel 27, 28 and 29 is connected via a set of electrode connectors 26 to surface electrodes 70. Each channel 27, 28 and 29 is in communication with a conditioner 25 that performs digital-to-analog signal conditioning upon receiving an incoming signal from surface electrodes 70.

The surface receiver 20 comprises a digital control module 24 and data acquisition module 23 which are in communication processing unit 21 which is in communication with the surface controller application software via the surface controller/surface receiver interface 22. The digital control module 24 accepts gain adjustment commands from the surface control application software via the processing unit 21. The digital signal gain is preferably incrementally adjustable. The conditioner 25, which is attached to the multiple channels 27, 28 and 29 performs band pass filtering to reject incoming frequencies outside of the ultra-low range utilized by the communication system 10, and pass the ultra-low-frequency modulated waves. The data acquisition module 23, digitizes the analog waveforms from the incoming signal from the subsurface transceiver 50 into binary words. The binary words are sent to the data acquisition module 23 of the surface receiver 20, which streams the digitized binary data to the surface controller 12 via the interface 22. The digitized binary data is then processed by the integration module (not shown) and demodulation module (not shown) of the surface control application software.

Figure 3:
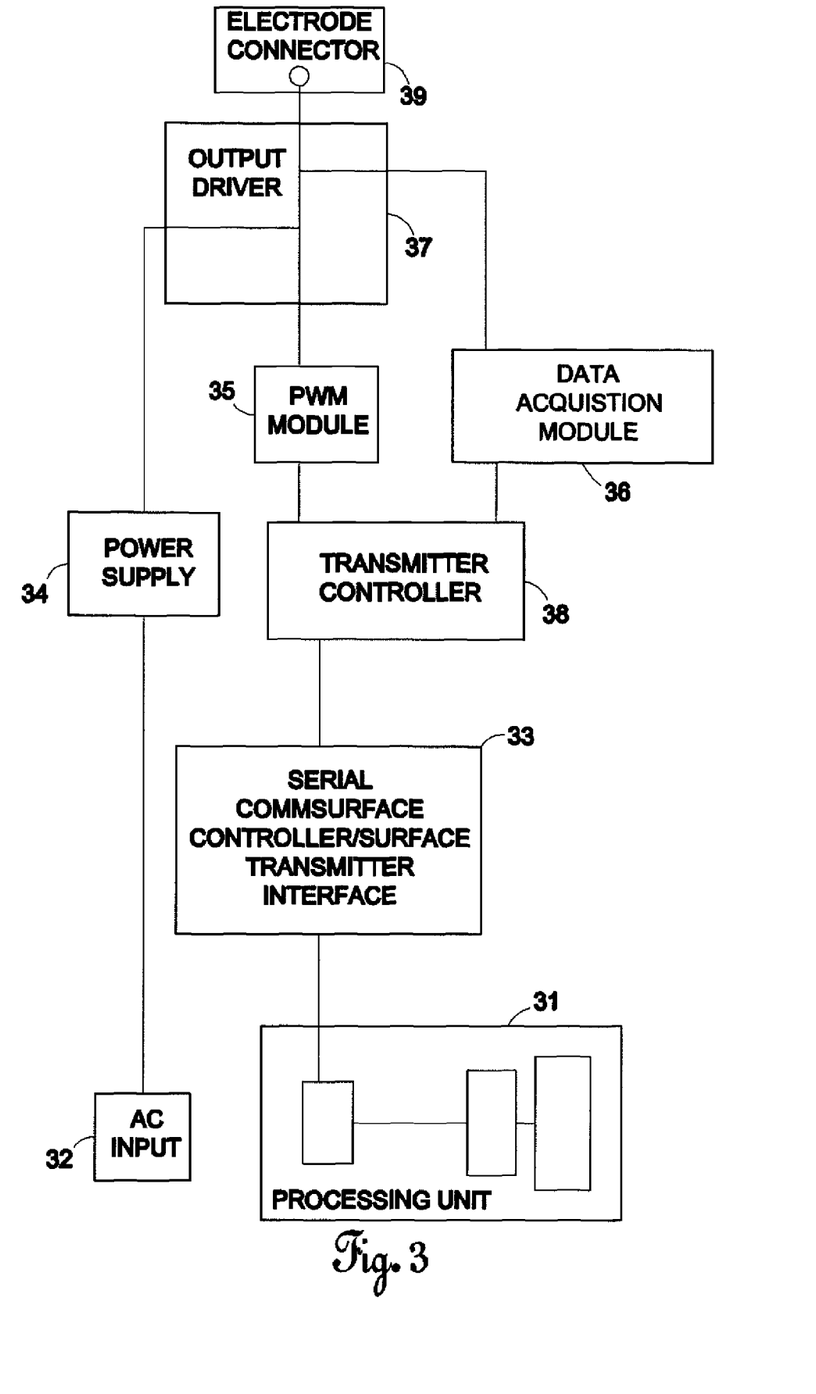
FIG. 3 is a block diagram showing the subcomponents of the surface transmitter of the present invention.

Referring to FIG. 3, a block diagram of the subcomponents of the surface transmitter 30 are disclosed. In the preferred embodiment, the surface transmitter 30 transmits predefined beacons of information from the surface controller 10 to the subsurface transceiver 50. The surface transmitter 30 comprises an alternate current input 32 which supplies power 34 to an output driver 37 of the surface transmitter 30. The surface transmitter 30 is in communication with the surface controller 12 via a surface controller/surface transmitter interface 33. In the preferred embodiment, interface 33 is established via serial connection. However, USB, wireless or Bluetooth interface is possible as well.

The user (not shown) of the surface controller 12 can select a predefined text message from a predefined message menu on the surface controller application software, which corresponds to a beacon or beacons of information in the form of binary data. The selected predefined digital text message is converted by the surface controller application software to analog binary data. The binary data are transmitted as command packets from the surface controller 12 to the processing unit 31 of the surface transmitter 30.

The processing unit 31 converts the command packets into phase-modulated carrier waves, and transmits those waves through a pulse width modulation module 35 to an output driver 37. The PWM module 35 encodes the analog carrier waves and the output driver 37 transmits the carrier waves through electrode connectors 39 to surface electrodes 70, as shown in FIG. 1A. The carrier waves are transmitted across the ultra-low-frequency electric current created by the surface electrodes 70 to the subsurface transceiver 50. Because the earth is a lossy conductor, transmitting using ultra-low-frequency minimizes loss between the surface transmitter 30 and subsurface transceiver 50.

A command-based protocol (not shown) is implemented by the surface controller application software that allows all needed functions and error handling to be accessed by the surface controller 12. The surface transmitter 30 has multiple user-selected power settings, and is capable of efficiently driving 0.25-500 Ohm loads.

Figure 5:
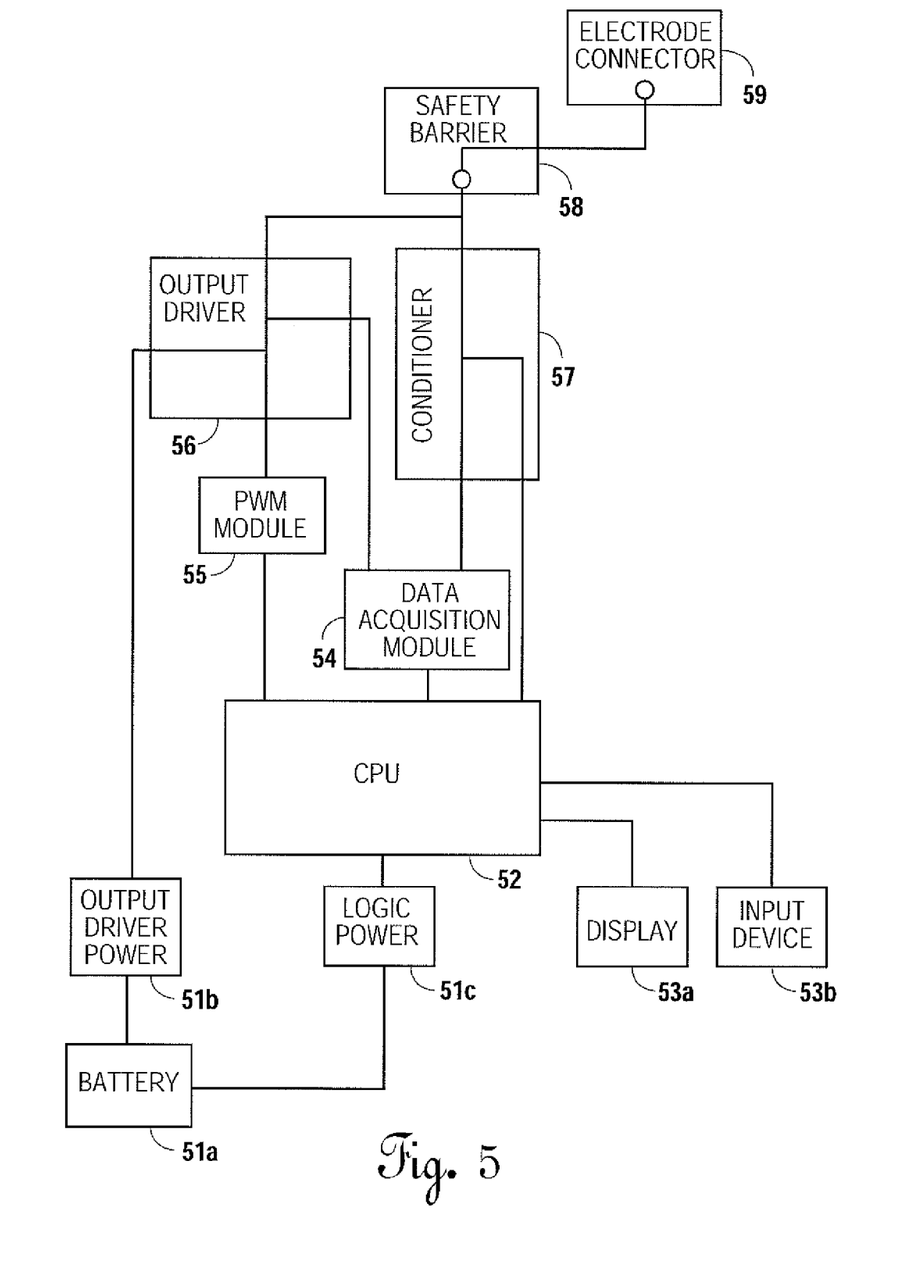
FIG. 5 is a block diagram showing the subcomponents of the subsurface transceiver of the present invention.

Referring to FIG. 5, the subcomponents of the subsurface transceiver 50 are disclosed. The subsurface transceiver 50 is preferably battery powered by a battery supply 51. The subsurface transceiver 50 comprises a display 53a and an input device 53b, such as a keyboard (not shown) or keypad (not shown), a CPU 52, a data acquisition module 54, a PWM module 55, an output driver 56, a conditioner 57, a safety barrier 58 and at least one set of subsurface electrode connectors 59. In one embodiment, all of the subcomponents of the subsurface transceiver 50 are contained within a single housing (not shown) that is suitable to eliminate explosion hazards in gassy mine environments.

The CPU 52 of the subsurface transceiver 50 performs the transmit and receive functions of the subsurface transceiver 50. As a phase modulated carrier wave is received by the subsurface electrodes 80, the signal is sent through the safety barrier 58 to the conditioner 57. The conditioner 57 performs band pass filtering to reject incoming frequencies outside of the ultra-low range utilized by the communication system. The data acquisition module 54 digitizes the analog waveforms from the incoming signal from the surface transmitter 30 into binary words, which are then streamed to the CPU 52. The digitized binary data is then processed and demodulated by the CPU 52, and sent as a text message or text data to display 53a.

A subsurface user of the subsurface transceiver 50 may use the input device 53b to select a predefined beacon from a predefined beacon menu stored on the CPU 52, or may use the input device 53b to create a text message to send to the surface receiver 20. The CPU 52 controls the PWM 55 module to convert the digital binary words to analog form, which sends the phase modulated carrier wave with the analog signal thereon to the output driver 56, which transmits the signal through the ultra-low-frequency electric current created by the subsurface electrodes 80 to the surface receiver 20.

In one aspect of the present invention, the surface control application software, in communication with the subsurface transceiver 50 through the surface transmitter 30, contains a monitoring module (not shown) which queries the subsurface transceiver 50 using downlink query commands (not shown) to request data on predefined parameters of the subsurface transceiver 50. Upon reception of the query command, the subsurface transceiver 50 returns the requested data via uplink transmission. Examples of parameters that are queried by the monitoring module are battery power/voltage, impedance between the subsurface transceiver 50 and the subsurface electrodes 80, RMS voltage of the last received downlinked transmission and temperature of the subsurface transceiver 50.

In another aspect of the present invention, the surface control application software provides a correction module (not shown) which executes an error correction algorithm (not shown). Before a byte of data is transmitted to the surface transmitter 30, the correction module calculates a "checksum" of the data byte. The computation of the checksum is at least a three step process whereby the data byte is inverted to create a checksum byte, the checksum byte is bit reversed and then XOR'ed with the original data byte to produce the final checksum. Thereafter, the correction module sends out redundancy data packets, which can contain up to eight copies of the same data (a data set being one byte plus its checksum) sent to the surface receiver 20. However, more or fewer than eight copies of data could be sent.

The surface receiver 20 then performs bit averaging wherein bits for each data set are averaged to compile a "composite" byte where the bits in the composite byte are the average of all 8 of the received bytes. In this manner, a composite byte is created for Data and Checksum. These bytes are then added to the packet and used as a $9^{th}$ pair for checksum comparison. Each data byte is compared to the checksum byte, including the composite byte. If a valid match is found after calculating the checksum from the data byte, that data/checksum pair is saved. Each data byte is checked against the remaining checksum bytes.

It is possible (and likely in high error conditions) that multiple valid checksums will be found with data bytes that are in error. For this reason, the correction module executes an algorithm counts how many of each valid data byte were found. The data byte value that has the highest count is then compared to a predefined threshold. If the number of occurrences of this data byte are over the threshold, and the data further meets the "confidence factor", then a valid received message is generated. Once the data bytes are determined an additional step is taken to verify that the error corrected data is valid data. This confidence factor is a correlation of a theoretical packet based on the error corrected data and the actual received data. If the correlation of the received data to the theoretical data is higher than a defined minimum, the data is considered to be valid.

Figure 4:
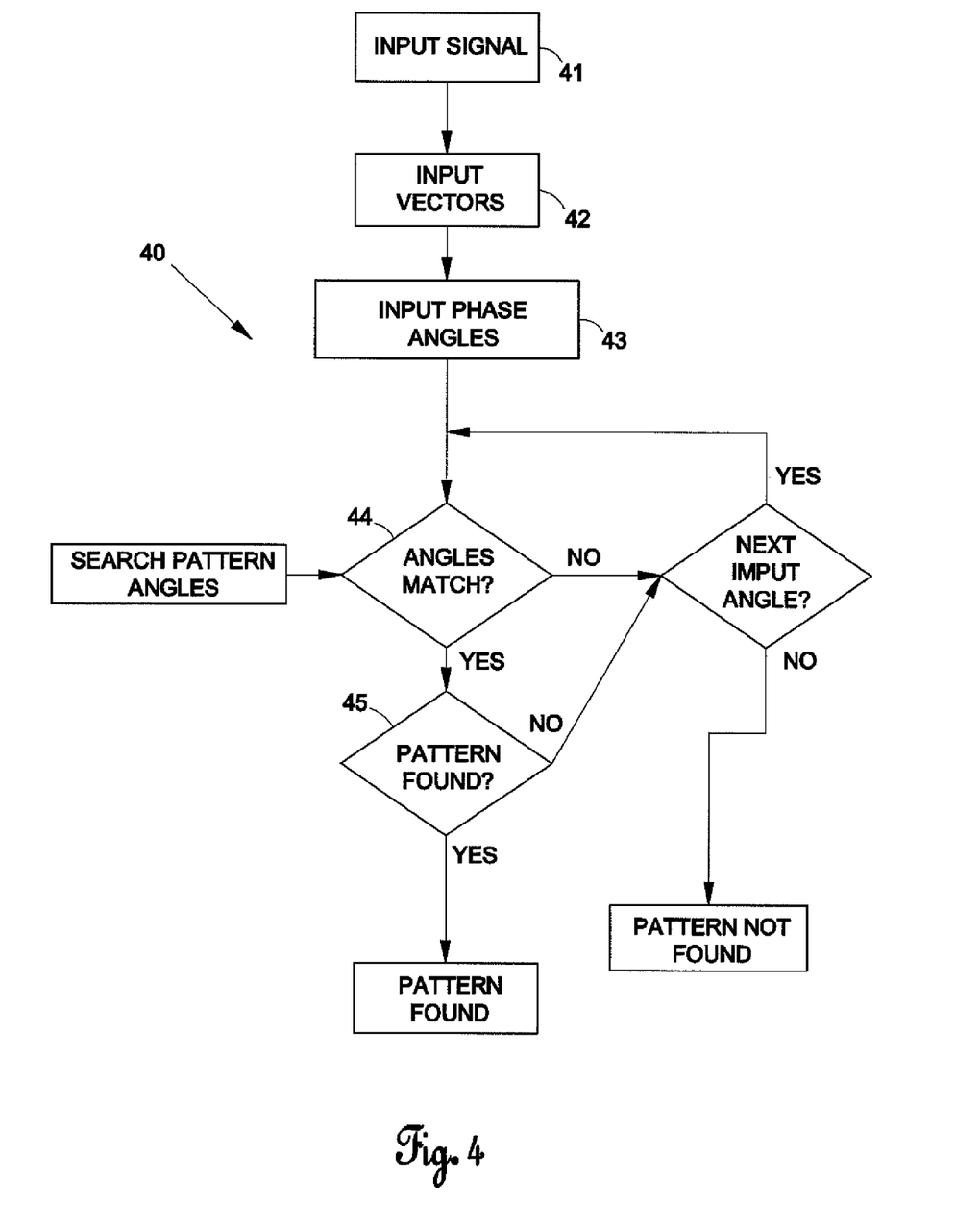
FIG. 4 is a flowchart showing the phase sync detection performance of the surface controller application software of the present invention.

Referring to FIG. 4, the phase detection algorithm 40 of the surface controller application software is shown. The phase detection algorithm 40 detects and recovers the uplinked signal data, or incoming signal 41 and transforms the input signal into input vectors 42, based on the QPSK modulation scheme. The input phase angles 43 of the vectors are then calculated to determine if the angles match 44. A match indicates that a phase synchronization header has potentially been discovered in the received signal, and the data is then passed to the demodulation module that converts the data into meaningful symbols corresponding to beacons, text or other data.

Figure 1B:
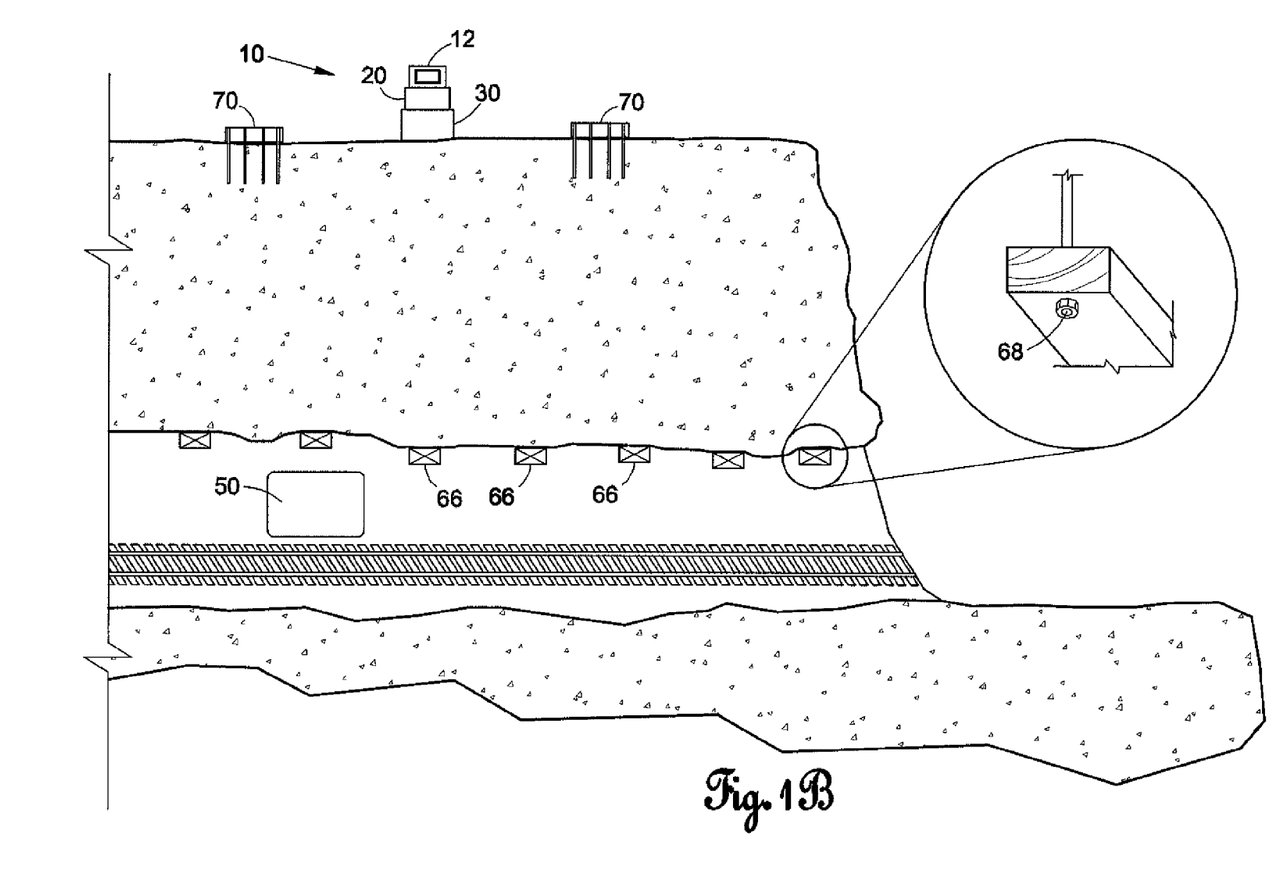
FIG. 1B is a side view showing an installation of the present invention in an alternative embodiment.
Figure 6:
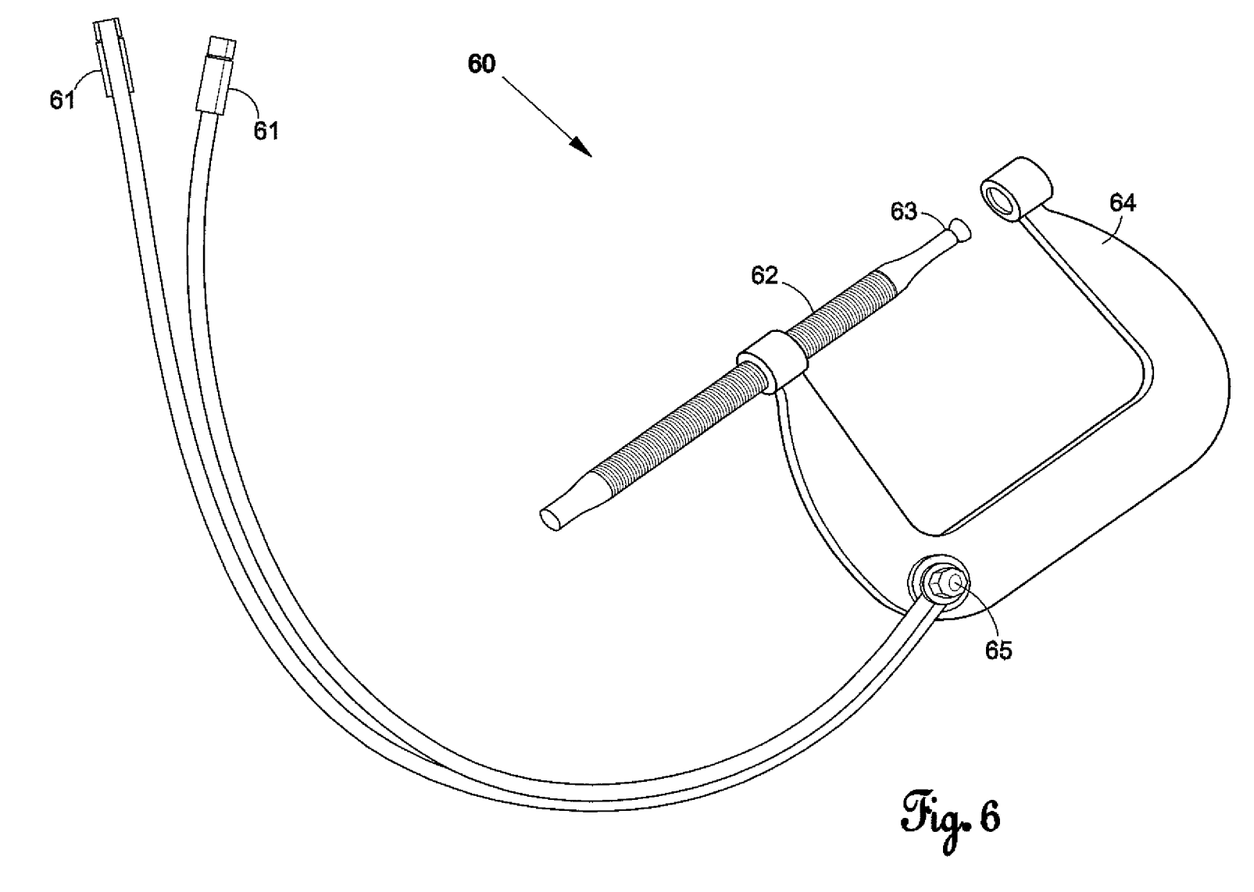
FIG. 6 is a perspective view of a subsurface electrode of the present invention.
Figure 7:
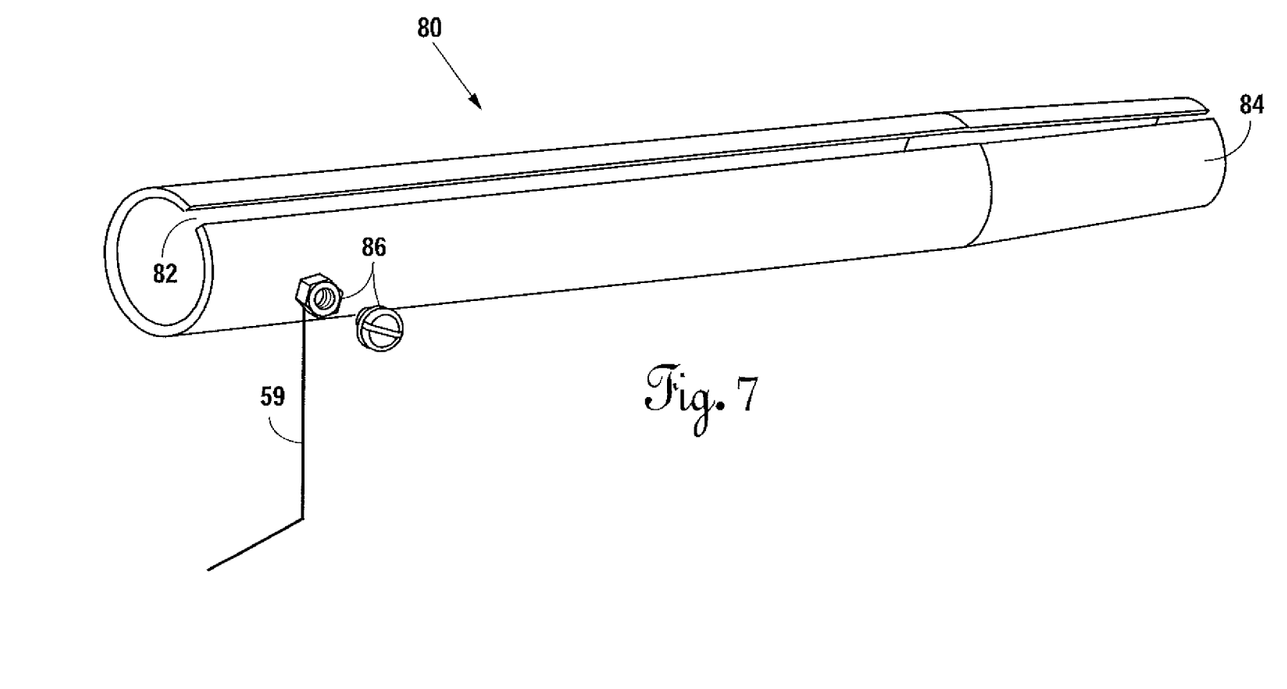
FIG. 7 is a perspective view of a subsurface electrode of the present invention.

Referring to FIG. 6 and FIG. 7, two different embodiments of the subsurface electrodes are disclosed. Referring to FIG. 6 and FIG. 1B, in one embodiment, the subsurface electrode 60 provides a special connection device that allows for rapid connection to metallic infrastructure 66 within the mine. Most coal mines have a roof structure that is supported by metallic roof bolts 68, roof straps (not shown) and the like. Grounding connections can be made using electrode 60 by tightening the threaded shank 62 such that the infrastructure metal is clamped tightly between the head 63 of the shank 62 and the arm 64 of the electrode 60. The head 63 of the shank 62 may use various surface designs to aid in penetrating corrosion to ensure adequate electrical conductivity is achieved. Connectors 61 are attached to the electrode 60 and connect into the subsurface transceiver 50.

Referring to FIG. 7 and FIG. 1A, in the preferred embodiment, the subsurface electrodes 80 comprise a plurality of steel pipes. The subsurface electrode 80 has a longitudinal slit 82 that extends the length of the subsurface electrode 80. One end of the electrode 80 has a tapered end 84, which aides in inserting the electrode 80 into the earth, and driving it therein. As the electrode 80 is inserted into the earth, slit 82 allows the electrode 80 to collapse, thereby creating a tight connection with the surrounding earth. Connectors 59 are connected via nut and bolt 86, or any other appropriate attaching mechanism, to the electrode 80. Connectors 59 then connect to the subsurface transceiver 80.

Referring to FIG. 1A, it is contemplated by the present invention that the subsurface electrodes 80 are inserted within the earth in certain predetermined areas of a mine, typically in pre-designated emergency chambers or areas. Subsurface transceivers 50 are likewise stored in close proximity to the subsurface electrodes in the predetermined areas of the mine. In operation of the present communication system 10, the subsurface users set up the subsurface transmitter 50 by connecting subsurface electrode connectors 59 to the subsurface electrodes 80.

On the surface, the user of the surface components first connects the surface electrodes 70 to the surface receiver 20 and surface transmitter 30, and establishes connection of the surface controller with surface receiver 20 through interface 22, and surface transmitter 30 through interface 33. The surface electrodes 70 are then configured to measure the resistivity of the earth and determine proper alignment of the surface electrodes 70 using the four-pole method described herein above. After proper alignment of the surface electrodes, the ultra-low-frequency electric current C is established between the surface electrodes 70.

In operation, a surface user may select from the predefined beacon menu on the surface controller's monitor 14 a predefined beacon of text data to send to the subsurface transceiver 50. Alternatively, the surface user may use a keyboard (not shown) or keypad (not shown) to create a customized text message to send to the transceiver. The predefined beacon of text data corresponds to a beacon or beacons of information in the foul of binary data. The selected predefined digital text message is converted by the surface controller application software to analog binary beacon data. The binary data are transmitted as command packets from the surface controller 12 to the processing unit 31 of the surface transmitter 30.

The processing unit 31 provides a set of commands to the pulse width modulation (PWM) module 35, which converts the command packets into phase-modulated carrier waves, and transmits those waves through the PWM module 35 to an output driver 37. The PWM module 35 encodes the analog carrier waves and the output driver 37 receives a set of commands from the processing unit 31, and transmits the carrier waves through electrode connectors 39 to surface electrodes 70. The carrier waves are transmitted across the ultra-low-frequency electric current C created by the surface electrodes 70 to the subsurface transceiver 50. Because the earth is a lossy conductor, transmitting through ultra-low-frequency minimizes loss between the surface transmitter 30 and subsurface transceiver 50.

As the phase modulated carrier wave is received by the subsurface electrodes 80, the signal is sent through the safety barrier 58 to the conditioner 57 of the subsurface transceiver 50. The conditioner 57 performs band pass filtering to reject incoming frequencies outside of the ultra-low range utilized by the communication system. The data acquisition module 54 digitizes the analog waveforms from the incoming signal which are then streamed to the CPU 52 The digitized binary data is then processed and demodulated by the CPU 52, and sent as a text message or text data to display 53a.

A subsurface user of the subsurface transceiver 50 may use the input device 53b to select a predefined beacon from a predefined beacon menu stored on the CPU 52, or may use the input device 53b to create a text message to send to the surface receiver 20. The CPU 52 controls the PWM module 55 to convert the digital binary words to analog form, which sends the phase modulated carrier wave with the analog signal thereon to the output driver 56, which transmits the signal through the ultra-low-frequency electric current created by the subsurface electrodes 80 to the surface receiver 20.

As the incoming signal from the subsurface transceiver 50 is received by the surface electrodes 70, the analog signal is transmitted to the conditioner 25 of the surface receiver 20 via electrode connectors 26. The conditioner 25 is in communication with the processing unit 21, which provides a set of instructions for the condition 25 to condition the incoming signal. The conditioner 25 performs band pass filtering to reject incoming frequencies outside of the ultra-low range utilized by the communication system. The digital control module 24 is in communication with the processing unit 21 and receives a set of commands there from to perform the gain adjustment commands from the amplification module of the surface controller application software. The binary words are then sent to data acquisition module 23 of the surface receiver 20, which streams the digitized binary data to the surface controller 12 via the interface 22. The digitized binary data is then processed by the integration module (not shown) and demodulation module (not shown) of the surface control application software, and displayed on the monitor 14 of the surface controller as text data.

Although the invention has been described with reference to specific embodiments, this description is not meant to be construed in a limited sense. Various modifications of the disclosed embodiments, as well as alternative embodiments of the invention will become apparent to persons skilled in the art upon the reference to the description of the invention. It is therefore contemplated that the appended claims will cover such modifications that fall within the scope of the invention.

We claim:

1. A portable through-the-earth communication system using ultra-low-frequency modulated electric carrier waves for communicating with individuals below the earth's surface, said system comprising:
    a surface control unit;
    a first set of surface electrodes and a second set of surface electrodes spaced from one another and grounded, said first set and said second set of surface electrodes establishing an ultra-low-frequency electric current there between to transmit said ultra-low-frequency modulated electric carrier waves through the earth;
    a surface receiver for receiving said ultra-low-frequency modulated electric carrier waves from said first and second set surface electrodes, said surface receiver being connected to said first and second set of surface electrodes and in communication with said surface control unit;
    a surface transmitter for transmitting said ultra-low-frequency modulated electric carrier waves through the earth to a subsurface transceiver, said surface transmitter being connected to said first and second set of surface electrodes and in communication with said surface control unit;
    wherein said subsurface transceiver is connected to at least one set of subsurface electrodes and is in communication with said surface transmitter for receiving said ultra-low-frequency modulated electric carrier waves;
    wherein said subsurface transceiver is in communication with said surface receiver and said surface control unit to transmit said ultra-low-frequency modulated electric carrier waves through the earth to said surface receiver; and
    wherein said at least one subsurface electrode is disposed within the earth, and beneath the earth's surface.

2. The communication system as disclosed in claim 1 wherein said surface control unit comprises monitor and a keyboard providing a user interface, and a surface controller application software, wherein said surface control unit executes said surface controller application software to communicate with said surface transmitter, said surface receiver and said subsurface transceiver.

3. The communication system as disclosed in claim 2 wherein said surface receiver is connected to said first and said second set of surface electrodes by a plurality of electrode connectors, and said surface receiver comprises:
    at least one input channel communicating with said plurality of electrode connectors to receive said ultra-low-frequency modulated electric carrier waves, said at least one input channel being in communication with at least one conditioner;
    a processing unit in communication with said at least one conditioner and providing a set of commands for said at least one conditioner to receive said ultra-low-frequency modulated electric carrier waves from said at least one input channel and perform analog-to-digital signal conditioning of said ultra-low-frequency modulated electric carrier waves to produce a digitized binary data set; and
    said processing unit being in communication with a data acquisition module and providing a set of commands for said data acquisition module to communicate with said at least one conditioner to receive said digitized binary data set, and transmit said digitized binary data set to said surface controller through an interface for said surface controller to communicate with said surface receiver.

4. The communication system as disclosed in claim 3 wherein said surface controller application software provides a set of commands to a demodulation module of said surface controller application software to demodulate said digitized binary data set, and
    wherein said surface controller application software provides a set of commands to an integration module of said surface controller application software to display said demodulated digitized binary data set as text on said monitor of said surface controller.

5. The communication system as disclosed in claim 4 wherein said surface controller application software comprises a beacon menu comprising a predefined set of digital text messages for display on said monitor of said surface controller, and a set of predefined analog binary beacon data corresponding to said predefined set of digital text messages; and
    wherein said surface controller application software provides a set of commands for converting said analog binary beacon data into corresponding command packets.

6. The communication system as disclosed in claim 5 wherein said surface transmitter is connected to said first and said second set of surface electrodes by a plurality of electrode connectors, and said surface transmitter comprises:
    a processing unit communicating with said surface controller to receive at least one of said command packets;
    said processing unit converting said command packets into ultra-low-frequency modulated electric carrier waves, and transmitting said waves to a pulse width modulation module of said surface transmitter;

said processing unit providing a set of commands for said pulse width modulation module to encode said ultra-low-frequency modulated electric carrier waves and send said ultra-low-frequency modulated electric carrier waves to an output driver of said surface transmitter;

said processing unit communicating with said output driver and providing a set of commands for said output driver to transmit said ultra-low-frequency modulated electric carrier waves to said first set and said second set of said surface electrodes; and wherein said first and said second set of surface electrodes transmit said ultra-low-frequency modulated electric carrier waves to said at least one set of subsurface electrodes.

7. The communication system as disclosed in claim 6 wherein said subsurface transceiver comprises a plurality of subsurface electrode connectors to connect to said at least one set of subsurface electrodes, said at least one set of subsurface electrodes receiving said ultra-low-frequency modulated electric carrier waves from said first and said second set of surface electrodes, and said subsurface transceiver comprises:

a central processing unit connected to a display unit and an input device;

said central processing unit being in communication with a conditioner of said subsurface transceiver, and providing a set of commands for said conditioner to receive said ultra-low-frequency modulated electric carrier waves from said at least one set of subsurface electrodes and perform analog-to-digital signal conditioning of said ultra-low-frequency modulated electric carrier waves to produce a digitized binary data set;

said central processing unit being in communication with a data acquisition module of said subsurface transceiver and providing a set of commands for said data acquisition module to communicate with said conditioner to receive said digitized binary data set, demodulate said digitized binary data set, and display said demodulated digitized binary data set as text on said display of said subsurface transceiver; and wherein said subsurface transceiver is connected to a battery.

8. The communication system as disclosed in claim 7 wherein said central processing unit of said subsurface transceiver comprises a beacon menu comprising a predefined set of digital text messages for display on said display, and a set of predefined analog binary beacon data corresponding to said predefined set of digital text messages; wherein said central processing unit provides a set of commands to convert said analog binary beacon data into corresponding command packets; and wherein said predefined set of digital text messages corresponds said predefined set of digital text messages of said surface controller application software.

9. The communication system as disclosed in claim 8 wherein:

said central processing unit converts said command packets into ultra-low-frequency modulated electric carrier waves, and transmits said ultra-low-frequency modulated electric carrier waves to a pulse width modulation module of said subsurface transceiver;

said central processing unit providing a set of commands for said pulse width modulation module to encode said ultra-low-frequency modulated electric carrier waves and send said ultra-low-frequency modulated electric carrier waves to an output driver of said subsurface transceiver;

said central processing unit communicates with said output driver and provides a set of commands for said output driver to transmit said ultra-low-frequency modulated electric carrier waves to at least one set of subsurface electrodes; and wherein said at least one set of subsurface electrodes transmit said ultra-low-frequency modulated electric carrier waves to said first and said second set of surface electrodes.

10. A method of communicating with individuals below the earth's surface using ultra-low-frequency modulated electric carrier waves across an ultra-low-frequency electric current, said method comprising:

establishing said ultra-low-frequency electric current through the earth's surface using the earth as the conductive media of said ultra-low-frequency electric current;

establishing communication between a surface transmitter and said ultra-low-frequency electric current;

establishing communication between a surface receiver and said ultra-low-frequency electric current;

establishing communication between said surface transmitter and a surface control unit;

establishing communication between said surface receiver and said surface control unit;

establishing communication between a subsurface transceiver and said ultra-low-frequency electric current;

selecting and sending a text message from a monitor of said surface controller;

converting with a surface controller application software of said surface controller said text message to said ultra-low-frequency modulated electric carrier waves;

transmitting with said surface transmitter said ultra-low-frequency modulated electric carrier waves through said ultra-low-frequency electric current to said subsurface transceiver;

converting with said subsurface transceiver said ultra-low-frequency modulated electric carrier waves to a text message;

displaying said text message on a display of said subsurface transceiver; and wherein said text message on said display corresponds to said text message selected from said surface controller.

11. The method of communicating with individuals below the earth's surface as recited in claim 10 further comprising the steps of:

selecting and sending a text message from said display of said subsurface transceiver;

converting with said subsurface transceiver said text message to said ultra-low-frequency modulated electric carrier waves;

transmitting with said subsurface transceiver said ultra-low-frequency modulated electric carrier waves through said ultra-low-frequency electric current to said surface receiver;

converting with said surface receiver said ultra-low-frequency modulated electric carrier waves into said text message;

sending said text message to said surface controller; and displaying said text message on said monitor of said surface controller;

wherein said text message displayed on said monitor corresponds to said text message selected from said display of said subsurface transceiver.

12. The method of communicating with individuals below the earth's surface as recited in claim 11 comprising:
inserting a first set of surface electrodes into the earth's surface;
inserting a second set of surface electrodes into the earth's surface spaced from said first set of surface electrodes;
connecting said first and said second set of surface electrodes to said surface receiver; and
connecting said first and said second set of surface electrodes to said surface transmitter;
wherein said first and said second set of surface electrodes establishes said ultra-low-frequency electric current.

13. The method of communicating with individuals below the earth's surface as recited in claim 12 comprising:
inserting a first set of subsurface electrodes into the earth from beneath the earth's surface;
inserting a second set of subsurface electrodes into the earth from beneath the earth's surface and spaced from said first set of subsurface electrodes; and
connecting said first and said second set of subsurface electrodes to said subsurface transceiver;
wherein said first and said second set of subsurface electrodes are in communication with said first and said second set of surface electrodes through said ultra-low-frequency electric current to transmit and receive said ultra-low-frequency modulated electric carrier waves; and
wherein said first and said second set of surface electrodes are in communication with said first and said second set of subsurface electrodes through said ultra-low-frequency electric current to transmit and receive said ultra-low-frequency modulated electric carrier waves.

14. The method of communicating with individuals below the earth's surface as recited in claim 13 wherein said wherein said converting with surface controller application software of said surface controller said text message step comprises:
executing a set of commands on said surface controller application software for converting said text message to an analog binary data set;
executing a set of commands on said surface controller application software to convert said analog binary data set into command packets;
sending said command packets to said surface transmitter;
receiving said command packets by said surface transmitter; and
executing a set of commands within said surface transmitter to convert said command packets into said ultra-low-frequency electric carrier waves.

15. The method of communicating with individuals below the earth's surface as recited in claim 14 wherein said transmitting with said surface transmitter step comprises:
executing a set of commands within said surface transmitter to encode said ultra-low-frequency modulated electric carrier waves;
sending said ultra-low-frequency modulated electric carrier waves to an output driver within said surface transmitter;
executing a set of commands to send said ultra-low-frequency modulated electric carrier waves to said first and said second set of surface electrodes;
wherein said first and said second set of surface electrodes transmit said ultra-low-frequency modulated electric carrier waves across said ultra-low-frequency electric current to said subsurface electrodes.

16. The method of communicating with individuals below the earth's surface as recited in claim 15 wherein said converting with said subsurface transceiver said ultra-low-frequency modulated electric carrier wave step comprises:
receiving said ultra-low-frequency modulated electric carrier waves by said first and said second set of subsurface electrodes;
sending said ultra-low-frequency modulated electric carrier waves to said subsurface transceiver;
executing a set of commands within a central processing unit of said subsurface transceiver to perform analog-to-digital signal conditioning of said ultra-low-frequency modulated electric carrier waves to produce a digitized binary data set;
executing a set of commands within said central processing unit to demodulate said digitized binary data set; and
sending said demodulated digitized binary data set to said display of said subsurface transceiver as said text message.

17. The method of communicating with individuals below the earth's surface as recited in claim 16 wherein said converting with said subsurface transceiver said text message step comprises:
executing a set of commands within said central processing unit of said subsurface transceiver to convert said text message into an analog binary data set;
executing a set of commands within said central processing unit of said subsurface transceiver to convert said analog binary data set into said command packets; and
executing a set of commands within said central processing unit of said subsurface transceiver to convert said command packets into said ultra-low-frequency modulated electric carrier waives.

18. The method of communicating with individuals below the earth's surface as recited in claim 17 wherein said transmitting with said subsurface transceiver step comprises:
executing a set of commands within said central processing unit of said subsurface transceiver to encode said ultra-low-frequency modulated electric carrier waives;
sending said ultra-low-frequency modulated electric carrier waives to an output driver of said subsurface transceiver;
executing a set of commands to send said ultra-low-frequency modulated electric carrier waves to said first and said second set of subsurface electrodes;
wherein said first and said second set of subsurface electrodes transmits said ultra-low-frequency modulated electric carrier waves across said ultra-low-frequency electric current to said surface electrodes.

19. The method of communicating with individuals below the earth's surface as recited in claim 18 wherein said converting with said surface receiver step comprises:
receiving said ultra-low-frequency modulated electric carrier waves by said first and said second set of surface electrodes;
sending said ultra-low-frequency modulated electric carrier waves to said surface receiver;
executing a set of commands within said surface controller application software to perform analog-to-digital signal conditioning of said ultra-low-frequency modulated electric carrier waves to produce a digitized binary data set;
executing a set of commands within said surface controller application software demodulate said digitized binary data set; and
sending said demodulated digitized binary data set to said monitor of said surface controller as said text message.

20. The method of communicating with individuals below the earth's surface as recited in claim 10 comprising:

inserting a first set of surface electrodes into the earth's surface;
inserting a second set of surface electrodes into the earth's surface spaced from said first set of surface electrodes;
connecting said first and said second set of surface electrodes to said surface receiver; and
connecting said first and said second set of surface electrodes to said surface transmitter;
wherein said first and said second set of surface electrodes establishes said ultra-low-frequency electric current.

* * * * *